ns Patent Office
3,416,007
Patented Dec. 10, 1968

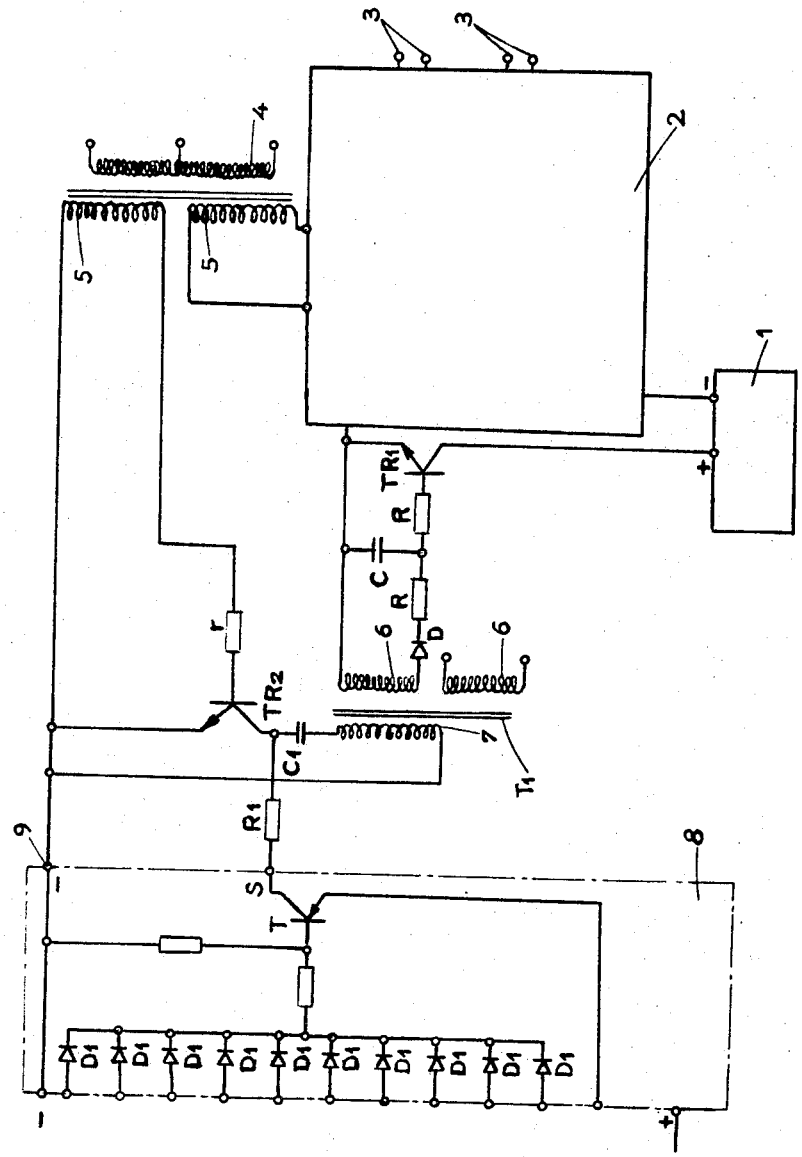

3,416,007
ELECTRONIC BLOCKING DEVICE FOR SIGNALS FROM A SIGNAL GENERATOR
Robert Chauprade, Puteaux, Hauts-de-Seine, France, assignor to Le Materiel Electrique S.W., Paris, France, a company of France
Filed Feb. 8, 1965, Ser. No. 430,881
Claims priority, application France, Feb. 7, 1964, 963,037
2 Claims. (Cl. 307—252)

ABSTRACT OF THE DISCLOSURE

Firing signals applied to the gates in the grid circuits of controlled rectifiers are blocked by a logic circuit. The firing circuit is connected to the collector of a transistor whose emitter is connected to a multiplier circuit for the firing control signals and the base and the emitter are connected to a secondary winding of a transformer. The primary winding of the transformer is connected between the collector and emitter of a second transistor whose base and emitter are connected to a secondary winding of a second transformer connected to a high frequency wave generator. The logic circuit is connected between the emitter and collector of the second transformer.

---

The present invention relates to a blocking device for signals emitted from a signal generator, applied in particular to the blocking of the firing signals of gates in the grid circuits of controlled rectifiers, the firing signals of the gates being emitted by a firing circuit connected to a multiplier circuit for the firing control signals.

Manufacturers and users attach more and more importance to negative biassing of the grid of controlled rectifiers either at the precise instant, or simply throughout the time that, the rectifier should be blocked. This negative biassing avoids the self-ignition of controlled rectifiers and allows them to absorb greater voltage gradiants without self-ignition occurring. Further, since it may happen that a controlled rectifier may be ignited by an industrial stray voltage providing the necessary energy for its firing, the negative biassing is that much more useful in ensuring the stability of controlled rectifiers.

Until now, these disadvantages were more or less well avoided by adding a capacitor in parallel between the grid and the cathode, of which the value could be several microfarads.

The present invention concerns a blocking device for signals comprising a first transistor, the collector of which is connected to one of the terminals of the firing circuit, the emitter is connected to a multiplier circuit for the firing control signals, and the base and the emitter are connected to one of the secondary windings of a first transformer of which the primary is connected between collector and emitter of a second transistor, by means of a capacitor, the base and the emitter of this second transistor being connected to one of the secondaries of a second transformer of a high-frequency wave-generator, a logic circuit being connected between emitter and collector of the second transistor.

The invention will now be described in more detail with reference to a particular embodiment shown in the single drawing.

In the drawing, a firing circuit 1 is connected to a signal distribution circuit 2, of which the output terminals 3 are connected to gates in the grid circuits of controlled rectifiers. The firing power of the signal distribution circuit 2 is provided by a wave-generator connected to the primary 4 of a transformer T2 having a number of secondaries 5.

The object of the present invention is, in certain cases, to block the signals coming from the firing circuit 1. The circuit comprises a first transistors TR1 of which the collector is connected to the firing circuit 1 and of which the emitter is connected to the signal distribution circuit 2 and to one of the secondary windings 6 of a transformer T1. The base of the transistor TR1 is connected to the other end of the secondary 6 via resistor R and diode D. A capacitor C is connected between the base resistor R and the emitter of the transistor TR1.

The primary 7 of the transformer T1 is connected by means of a capacitor C1 and a resistor R1 on the one hand to an output terminal S of a logic circuit 8 and on the other hand to the collector of a second transistor TR2. The base of the latter is connected by means of a resistor r to one end of a secondary winding 5 of a transformer T2, while the emitter is connected both to the other end of the winding 5 of the transformer T2 and to a terminal 9 of the logic circuit 8. The logic circuit 8 is an OR circuit of known type, and comprises a transistor T and diode input circuits D1 receiving information from various sources.

The device according to the invention is designed to block the signals which are emitted by the signal distribution circuit 2.

The circuit described above is supplied by the logic signal 0 or 1 from the circuit 8. The logic signal being in the state 1, the transistor TR2 chops the logic signal and the capacitor C1 applies the alternating signal to the primary 7 of the transformer T1. The signal is picked up again at a secondary 6, after rectification by the diode D and filtering by the resistors R and the capacitor C, and saturates the transistor TR1 which constitutes a gate in the firing circuit 1, the firing signal being passed to the distribution circuit 2.

If the logic signal is in the state 0, no voltage appears at the base circuit of the transistor TR1 which therefore is blocked and the firing signal from the circuit 1 is not passed to the distribution circuit 2.

The transformer T1 has as many secondaries 6 as there are outputs from the firing circuits 1.

The blocking of the transistor TR1 may be required for various reasons, such for example as a reversal of motion, or the braking of a motor supplied by control rectifiers controlled by the signals distribution circuit 2, or at the time of a fault, or simply because it is wished to block it. These various reasons requiring the same result of the blocking of the transistor make the OR circuit 8 necessary.

Naturally, the invention is not limited by the details of the embodiment shown in the drawing. These can be altered without departing from the scope of the invention.

I claim:
1. A blocking device for signals emitted from a signal generator, applied in particular to the blocking of the firing signals of gates in the grid circuits of controlled rectifiers, a firing circuit providing the firing signals for the gates, a multiplier circuit connected to the firing circuit for the firing control signals, a first transistor, a collector for said first transistor connected to one of the terminals of the firing circuit, an emitter for said first transistor connected to the multiplier circuit for the firing controls signals, a base for said first transistor, a first transformer, secondary windings for said first transformer, the base and the emitter of said first tranistor being connected to one of said secondary windings of said first transformer, a primary winding for said first transformer, a second transistor having a second collector, a second base and a second emitter, said primary winding being connected between said second collector and said second emitter through a capacitor, a second transformer of a high frequency wave generator having a second primary and second secondary windings, said second base and said second emitter being connected to one of said second secondary windings and a logic circuit connected between said second emitter and said second collector.

2. A blocking device for signals as described in claim 1, one of said second secondary windings supplying said multiplier circuit, said second primary being connected to the output terminals of said high frequency wave generator.

References Cited

UNITED STATES PATENTS

| | | | |
|---|---|---|---|
| 3,060,267 | 10/1962 | Feder | 307—88.5 X |
| 3,084,338 | 4/1963 | Mauer et al. | 307—88.5 X |
| 3,139,143 | 6/1964 | Renda | 307—88.5 X |
| 3,200,327 | 8/1965 | Fleming | 307—88.5 X |
| 3,264,491 | 8/1966 | Davis | 307—88.5 |

ARTHUR GAUSS, *Primary Examiner*

DONALD D. FORRER, *Assistant Examiner.*

U.S. Cl. X.R.

307—215, 244, 253